UNITED STATES PATENT OFFICE.

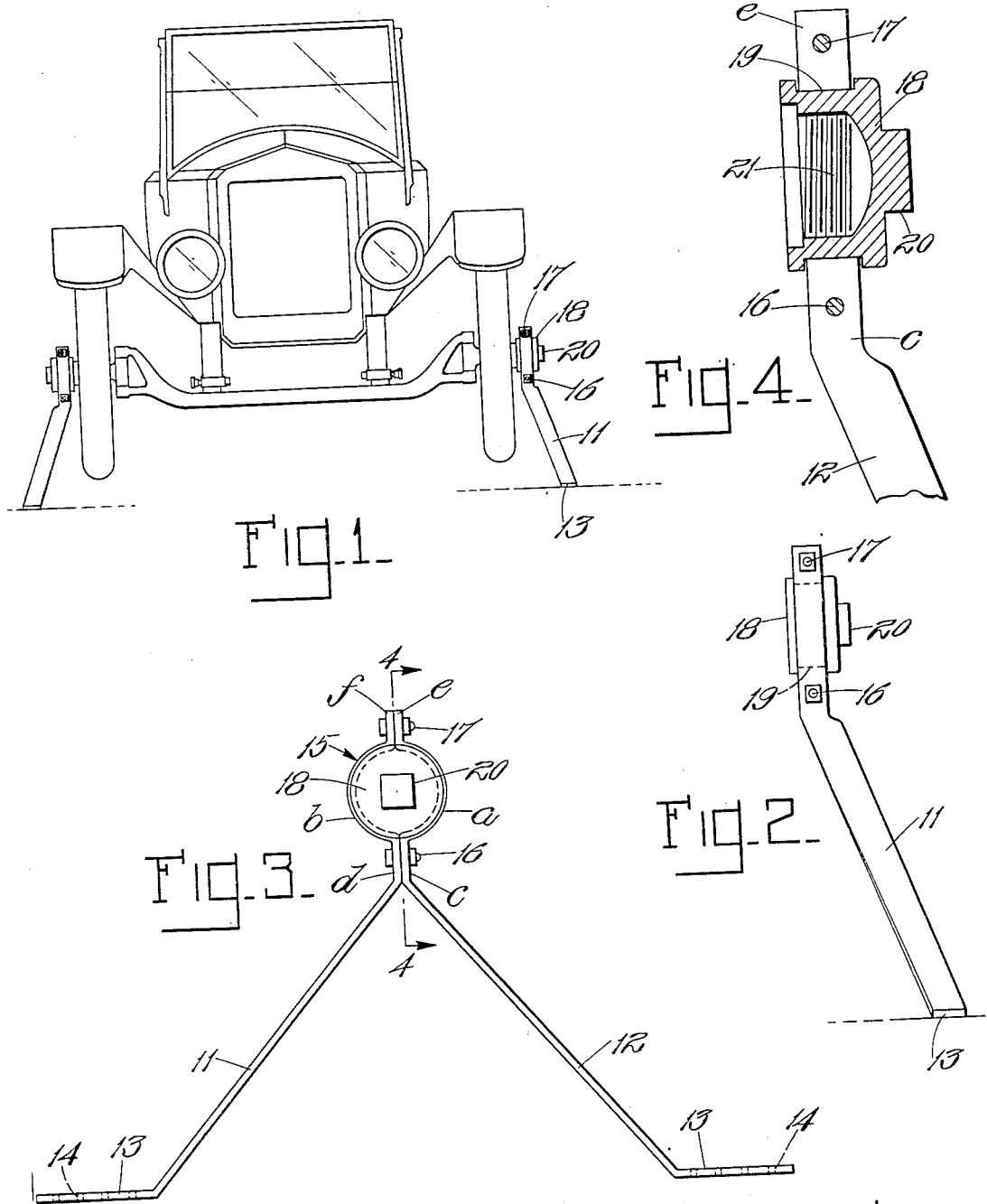

FREDERICK H. CURRY, OF DETROIT, MICHIGAN.

SHIPPING-STANDARD FOR AUTOMOBILES.

1,396,360.

Specification of Letters Patent. Patented Nov. 8, 1921.

Application filed August 23, 1920. Serial No. 405,550.

*To all whom it may concern:*

Be it known that I, FREDERICK H. CURRY, a citizen of the United States, residing at Detroit, county of Wayne, State of Michigan, have invented a certain new and useful Improvement in Shipping-Standards for Automobiles, of which the following is a specification, reference being had therein to the accompanying drawings.

My invention has for its object a new and improved shipping standard by which to support an automobile in a freight car. The use of the standard embodying my invention does away altogether with the ties, wheel blocks and horses which have heretofore been used for the purpose. The standard is so designed that it not only supports the automobile but also prevents the car moving either sidewise or endwise.

The standard embodying my invention comprises two inclined legs of bar iron or other suitable material formed at the top into an eye which surrounds a special exteriorly grooved hub cap which can be revolved in the eye and screwed onto the wheel of the vehicle with which the standard is to be used. The legs of the standard are formed at the bottom into feet which are screwed or bolted to the floor of the freight car. The legs are inclined toward each other and also toward the automobile so that they withstand the strains due to the sudden starting and stopping of the freight car.

The standard embodying my invention is inexpensive to construct and may be used repeatedly.

The invention will be fully understood from the following description when taken in connection with the accompanying drawings, and the novel features thereof will be pointed out and clearly defined in the claims at the close of this specification.

In the drawings, Figure 1 is a front view of an automobile supported by standards embodying my invention.

Fig. 2 is a front view of one of said standards.

Fig. 3 is a side view of the standard.

Fig. 4 is a section on line 4—4 of Fig. 3.

Referring now to the drawings, the standard embodying my invention is preferably made of two legs 11 and 12 of bar iron or similar suitable material. Each leg is provided with a foot 13 pierced by holes 14 by which the standard is nailed, screwed or bolted to the floor of the freight car or is otherwise secured in place. The legs are inclined relatively to the feet 13 and the floor as shown in Figs. 1 and 2, so that, when in place, they resist lateral swaying of the automobile caused by the movements of the freight car. The legs 11 and 12 are inclined toward each other forming an angle at about the apex of which is an eye 15 formed by shaping the metal as shown, to form two semi-circular portions *a* and *b* adjacent which are flat portions *c, d* and *e, f* which are brought together and riveted or bolted as shown at 16 and 17. When the standard is in place under the vehicle, the portion above the apex is vertical. In the eye is placed a nut 18 conveniently called a grooved hub cap, having a groove 19 about its periphery, the groove being of a size to receive the metal which forms the eye 15. The hub cap is provided with a wrench receiving portion 20, and is threaded as shown at 21 to engage the threads on the wheel of the vehicle. The grooved hub cap 18 is revoluble in the eye 15.

In using the standards embodying my invention, the regular hub caps are removed from the automobile, the automobile is raised up to the proper position, and the standards are secured to the wheels by screwing the grooved hub caps 18 in place. The automobile is then lowered into position with the feet of the standards resting on the floor of the freight car. The feet are then screwed or nailed in place, and thus the automobile is firmly secured in position to be transported safely. The amount of labor necessary to load on automobile into a freight car when standards embodying my invention are used is very small indeed.

What I claim is:—

1. The improved shipping standard for automobiles comprising legs having an eye in which is a hub cap for engagement with a wheel of the automobile with which the standard is to be used.

2. The improved shipping standard for automobiles comprising legs having an eye in which is a revoluble grooved hub cap for engagement with a wheel of the automobile with which the standard is to be used.

3. The improved shipping standard for automobiles comprising inclined legs formed at the apex into an eye and having in said eye a revoluble grooved hub cap for engagement with a wheel of the automobile with which the standard is to be used.

4. The improved shipping standard for automobiles comprising a pair of inclined legs made of bar iron, said legs being brought together and then bent into circular shape to form an eye at the apex of said inclined legs, and an exteriorly grooved revoluble hub cap in the said eye.

5. The improved shipping standard for automobiles comprising a pair of inclined legs made of bar iron, said legs being brought together and then bent into circular shape to form an eye at the apex of said inclined legs, and an exteriorly grooved revoluble hub cap in the said eye, the portion of the standard which is above the apex of said inclined legs being vertical and the portion which is below being slanted from the base inwardly toward the vehicle with which the standard is to be used.

In testimony whereof I affix my signature.

FREDERICK H. CURRY.